United States Patent Office 3,334,116
Patented Aug. 1, 1967

3,334,116
PHTHALOCYANINE DYESTUFFS
Wilson J. Bryan, Jr., Charlotte, Thomas E. Lesslie, Mount Holly, and Gordon A. Geselbracht, Charlotte, N.C., assignors to Martin-Marietta Corporation, a corporation of Maryland
No Drawing. Filed June 8, 1964, Ser. No. 373,576
6 Claims. (Cl. 260—314.5)

The present invention relates to phthalocyanine dyestuffs and to the method for making same.

The phthalocyanine dyestuffs of the present invention may be represented by the formula

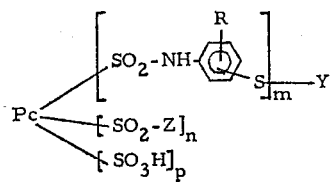

wherein Pc is the radical of a phthalocyanine; Y is a member selected from the group consisting of $—H_m$, $(—SO_3Na)_m$, $(—SO_3K)_m$ and

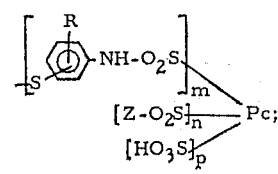

R is a member selected from the group consisting of hydrogen, halogen, alkoxy and alkyl; Z is a member selected from the group consisting of $—NH_2$, $—NH$—lower alkyl,

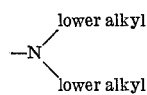

—NH-aryl, —NH—NH$_2$, —NH—NH-aryl, —NHOH, —NH—NH-lower alkyl, and

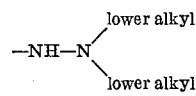

$m$ is a number from 1-3; $n$ is a number from 1-3; $p$ is a number from 0-2; and the sum of $m+n+p$ is a number from 2-4.

The dyestuffs of the above formula may be synthesized by a process comprising the steps of condensing a molecular proportion of

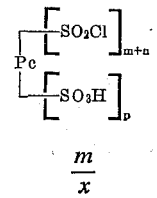

with $$\frac{m}{x}$$

molecular proportions of a compound of the formula

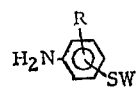

wherein W is a member selected from the group consisting of $—SO_3Na$, $—SO_3K$, and

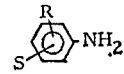

and condensing the resulting condensate with $n$ molecular proportions of HZ, wherein Pc, R, Z, $m$, $n$, $p$, and $m+n+p$ are as above defined, and $x$ is the number of amino groups per molecule of

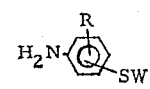

Pyridine or picolines may be used advantageously to catalyze the above condensations.

The dyestuffs of the present invention may be produced in the Bunte salt form ($—SSO_3$ or $—SSO_3K$), or mercapto form (—SH), or disulfide form (—S—S—).

In the Bunte salt form, the dyes of the present invention have the formula

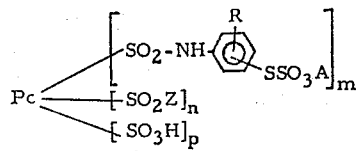

and they may be synthesized by condensing a molecular proportion of

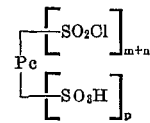

with $m$ molecular proportions of

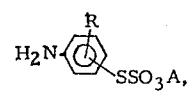

and condensing the resulting condensate with $n$ molecular proportions of HZ, wherein Pc, Z, R, $m$, $n$, and $m+n+p$ are as above defined, and A is a member selected from the group consisting of Na and K. The Bunte salt form of the dyes may be isolated by evaporating to dryness the Bunte salt solutions resulting from the condensation step. In preparing the Na Bunte salt, the condensation will be conducted in the presence of a sodium base, and in preparing the K Bunte salt, the condensation will be conducted in the presence of a potassium base.

In the mercapto form, the dyes of the present invention have the formula

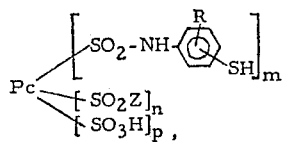

and they may be synthesized by hydrolyzing the above Bunte salt form with acid.

In the disulfide form, the dyes of the present invention have the formula

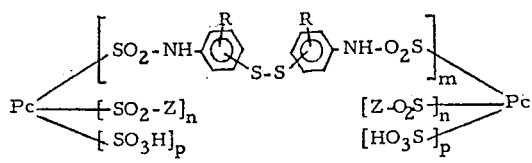

and they may be synthesized by condensing a molecular proportion of

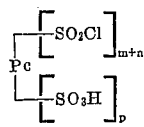

with $$\frac{m}{x}$$

molecular proportions of

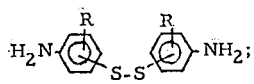

and condensing the resulting condensate with $n$ molecular proportions of HZ, wherein Pc, R, Z, $m$, $n$, $p$, and $m+n+p$ are as above defined and $x$ is the number of amino groups per molecule of

The dyestuffs of the present invention are particularly suitable for coloring a number of textile materials, such as cotton and regenerated cellulose, without limitation thereto.

The dyestuffs of the present invention have a number of advantages, some of which follow.

The dyestuffs are particularly characterized by their brilliance, light fastness, wash fastness, lack of off-tone fading, high tinctorial value, sulfide solubility, and ease of application to textile fibers by the reduction-oxidation method. The dyestuffs are further characterized by excellent properties of penetration into cotton and regenerated cellulose fibers. If desired, the dyes of the present invention may be reacted with formaldehyde to replace hydrogen atoms attached to nitrogen atoms with methylol groups, thereby providing dyes with the following valuable properties, e.g. fixability of the dye to textile fibers by means of the methylol group, and dyeability in combination with resins, such as formaldehyde condensation resins, wherein the dye and resin are co-condensed.

The following are specific and non-limiting examples of methods of embodying the present invention. All parts in these examples are by weight unless otherwise specified.

*Example 1*

The bright blue dyestuff of the formula

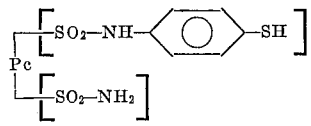

wherein Pc is the radical of copper phthalocyanine, may be prepared as follows.

77.3 parts (0.10 mol) of copper phthalocyanine disulfonyl chloride are slurried with ice and water at 0° C. to 1,000 parts, and adjusted to pH 5.5–6.0 by adding 20% aqueous $Na_2CO_3$; 25.0 parts (0.11 mol) of sodium S-4-aminophenylthiosulfate and 5 parts of pyridine catalyst are added thereto; the resulting mass is stirred for 1–2 hours at 0° C. while pH 7.0 is maintained by adding 42 parts 20% aqueous $Na_2CO_3$ as needed, thereby permitting condensation.

180 parts 29% aqueous ammonia are added to the resulting condensate; the mass is warmed to room temperature and stirred 24 hours to effect a second condensation. At this stage the dyestuff exists as a solution of the Bunte salt, and if desired, this solution may be evaporated to dryness and isolated as

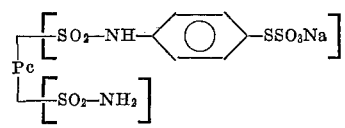

wherein Pc is the radical of copper phthalocyanine.

(The corresponding potassium Bunte salt may be prepared by substituting an equimolar amount of potassium S-4-aminophenylthiosulfate for the sodium S-4-aminophenylthiosulfate, and KOH or $K_2CO_3$ for the $Na_2CO_3$ in the above).

The above mercapto (SH) form of the dyestuff may be prepared by hydrolyzing the above solution of the Bunte salt with an acid, such as by adding 850 parts 32% HCl and heating at reflux 6 hours.

The dyestuff is isolated by cooling the mass to 50° C., filtering, collecting the solids, washing the solids acid free with warm water, and optionally drying or preserving in the moist condition for subsequent use in preparation of a printing paste.

In the examples given in the following table the procedure is the same as that given in Example 1, and the examples in the table indicate that a molecular proportion of the particular phthalocyanine disulfonyl chloride in the second column is reacted with a molecular proportion of the thiosulfate in the third column, and the result condensed with a molecular proportion of the HZ compound in the fourth column to produce the dye shown by structural formula in the fifth column, in which formula Pc represents the radical of the phthalocyanine portion of the sulfonyl chloride shown in the second column.

| Ex. No. | Phthalocyanine disulfonyl chloride | Thiosulfate | HZ | Dye | Color |
|---|---|---|---|---|---|
| 2 | Cobalt phthalocyanine disulfonyl chloride. | Potassium S-(5-amino-2-chlorophenyl)thiosulfate. | Methylamine | Pc[—SO$_2$NH—⟨○⟩(SH)(Cl)][—SO$_2$NH—CH$_3$] | Blue. |
| 3 | Nickel phthalocyanine disulfonyl chloride. | Sodium S-(2-amino-4-methoxyphenyl(thiosulfate. | Dimethylamine | Pc[—SO$_2$—NH—⟨○⟩(SH)(OCH$_3$)][—SO$_2$—N(CH$_3$)$_2$] | Green. |
| 4 | Phthalocyanine disulfonyl chloride. | Sodium S-(4-amino-3-methylphenyl)thiosulfate. | Aniline | Pc[—SO$_2$—NH—⟨○⟩(CH$_3$)(SH)][—SO$_2$—NH—⟨○⟩] | Blue. |
| 5 | Copper phthalocyanine disulfonyl chloride. | Sodium S-4-aminophenylthiosulfate. | Hydrazine | Pc[—SO$_2$—NH—⟨○⟩—SH][—SO$_2$—NH—NH$_2$] | Green. |

Example 6

The blue dyestuff of the formula

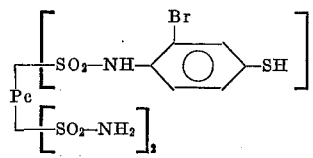

wherein Pc is the radical of phthalocyanine, may be prepared as follows.

This example is the same as Example 1 above, except that 81.0 parts (0.10 mol) of phthalocyanine trisulfonyl chloride are substituted for the copper phthalocyanine disulfonyl chloride of Example 1, except that 33.7 parts (0.11 mol) of sodium S-(4-amino-3-bromophenyl)thiosulfate are substituted for the sodium S-4-aminophenylthiosulfate of Example 1, and except that the amount of ammonia is increased to 200 parts.

In the examples given in the following table the procedure is the same as that given in Example 6, and the examples in the table indicate that a molecular proportion of the particular phthalocyanine trisulfonyl chloride in the second column is reacted with a molecular proportion of the thiosulfate in the third column, the result condensed with two molecular proportions of the HZ compound in the fourth column to produce the dye shown by structural formula in the fifth column, in which formula Pc represents the radical of the phthalocyanine portion of the sulfonyl chloride in the second column.

| Ex. No. | Phthalocyanine trisulfonyl chloride | Thiosulfate | HZ | Dye | Color |
|---|---|---|---|---|---|
| 7 | Nickel phthalocyanine trisulfonyl chloride. | Potassium S-(3-amino-5-ethoxyphenyl)thiosulfate. | Aniline | Pc[—SO$_2$—NH—⟨○⟩(SH)(CH$_3$—CH$_2$O)][—SO$_2$—NH—⟨○⟩]$_2$ | Blue. |
| 8 | Cobalt phthalocyanine trisulfonyl chloride. | Sodium S-(2-amino-5-ethylphenyl)thiosulfate. | Diethylamine | Pc[—SO$_2$—NH—⟨○⟩(SH)(CH$_3$—CH$_2$)][—SO$_2$—N(CH$_2$—CH$_3$)$_2$]$_2$ | Green. |
| 9 | Copper phthalocyanine trisulfonyl chloride. | Sodium S-4-aminophenylthiosulfate. | Ethylamine | Pc[—SO$_2$—NH—⟨○⟩—SH][—SO$_2$—NH—CH$_2$—CH$_3$]$_2$ | Do. |

| Ex. No. | Phthalocyanine trisulfonyl chloride | Thiosulfate | HZ | Dye | Color |
|---|---|---|---|---|---|
| 10 | Phthalocyanine trisulfonyl chloride. | Sodium S-3-aminophenyl-thiosulfate. | Phenylhydrazine | Pc[—SO₂—NH—⟨⟩—SH / —SO₂—NH—NH—⟨⟩]₂ | Do. |
| 11 | Copper phthalocyanine trisulfonyl chloride. | Sodium S-4-aminophenyl-thiosulfate. | 4-nitrophenyl-hydrazine. | Pc[—SO₂—NH—⟨⟩—SH / —SO₂—NH—NH—⟨⟩—NO₂]₂ | Do. |

Example 12

The blue dyestuff of the formula

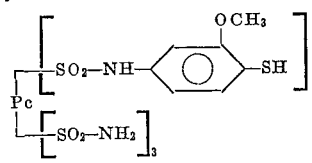

wherein Pc is the radical of nickel phthalocyanine, may be prepared as follows.

This example is the same as Example 1 above, except that 96.5 parts (0.10 mol) of nickel phthalocyanine tetrasulfonyl chloride are substituted for the copper phthalocyanine disulfonyl chloride of Example 1, except that 28.3 parts (0.11 mol) of sodium S-(4-amino-2-methoxyphenyl)thiosulfate are substituted for the sodium S-4-aminophenylthiosulfate of Example 1, except that the amount of ammonia is increased to 200 parts, and except that 5 parts of 4-picoline are substituted for the pyridine of Example 1.

In the examples given in the following table the procedure is the same as that given in Example 12, and the examples given in the table indicate that a molecule proportion phthalocyanine tetrasulfonyl chloride in the second column is reacted with a molecular proportion of the thiosulfate in the third column, and the result condensed with three molecular proportions of the HZ compound in the fourth column to produce the dye shown by structural formula in the fifth column, in which Formula Pc represents the radical of the phthalocyanine portion of the sulfonyl chloride shown in the second column.

| Ex. No. | Phthalocyanine tetra-sulfonyl chloride | Thiosulfate | HZ | Dye | Color |
|---|---|---|---|---|---|
| 13 | Cobalt phthalocyanine tetrasulfonyl chloride. | Sodium S-(3-amino-5-methylphenyl)thiosulfate. | Aniline | Pc[—SO₂—NH—⟨⟩(SH, CH₃) / —SO₂—NH—⟨⟩]₃ | Green. |
| 14 | Copper phthalocyanine tetrasulfonyl chloride. | Potassium S-2-aminophenyl thiosulfate. | Methylethyl-amine. | Pc[—SO₂—NH—⟨⟩—SH / —SO₂—N(CH₂—CH₃)(CH₃)]₃ | Do. |
| 15 | Phthalocyanine tetra-sulfonyl chloride. | Sodium S-(4-amino-3-fluoro-phenyl)thiosulfate. | Methylamine | Pc[—SO₂—NH—⟨⟩(F)—SH / —SO₂—NH—CH₃]₃ | Do. |
| 16 | Cobalt phthalocyanine tetrasulfonyl chloride. | Sodium S-(2-amino-4-chloro-phenyl)thiosulfate. | Methylhydrazine | Pc[—SO₂—NH—⟨⟩(SH, Cl) / —SO₂—NH—NH—CH₃]₃ | Do. |

Example 17

The blue dyestuff of the formula

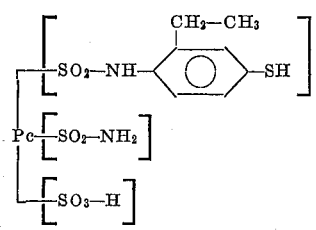

wherein Pc is the radical of cobalt phthalocyanine may be produced as follows.

84.9 parts (0.10 mol) of cobalt phthalocyanine disulfonyl chloride monosulfonic acid are slurried with ice and water at 0° C. to 800 parts, and adjusted to pH 5.5–6.0 by adding 20% aqueous $Na_2CO_3$; 28.1 parts (0.11 mole) of sodium S-(4-amino-3-ethylphenyl)thiosulfate and 5 parts of 3-picoline catalyst are added thereto; the resulting mass is stirred at 0° C. 1–2 hrs. while pH 7.0 is maintained by adding 42 parts 20% aqueous $Na_2CO_3$ as needed, thereby permitting condensation.

180 parts 29% aqueous ammonia are added to the resulting condensate; the mass is warmed to room temperature and stirred 24 hours to effect a second condensation, whereupon the dye is in the form of a solution of the thiosulfuric acid salt.

If desired, the dyestuff may be isolated at this point as the thiosulfuric acid salt ($-S-SO_3Na$) by evaporating to dryness, or it may be hydrolyzed and recovered in the mercapto ($-SH$) form as follows.

170 parts 98% $H_2SO_4$ are added to the resulting condensate; the temperature of the mass is gradually raised to reflux during a period of 3 hours, and reflux is maintained 12 hours.

The dyestuff is isolated by cooling the mass to 50° C., filtering, collecting the solids, washing the solids acid free with warm water, and optionally drying or preserving in the moist condition for subsequent use in the preparation of a printing paste.

In the examples given in the following table, the procedure is the same as that given in Example 17, and the examples in the tables indicate that a molecular proportion of the particular phthalocyanine disulfonyl chloride monosulfonic acid in the second column is reacted with molecular proportion of the thiosulfate in the third column, and the result condensed with a molecular proportion of the HZ compound in the fourth column to produce the dye shown in the fifth column, in which formula Pc represents the radical of the phthalocyanine portion of the disulfonyl monosulfonic acid shown in the second column.

| Ex. No. | Phthalocyanine disulfonyl chloride monosulfonic acid | Thiosolfate | HZ | Dye | Color |
|---|---|---|---|---|---|
| 18 | Copper phthalocyanine disulfonyl chloride monsulfonic acid. | Sodium S-3-aminophenyl thiosulfate. | 2-chloroaniline | (structure) | Blue. |
| 19 | Phthalocyanine disulfonyl chloride monosulfonic acid. | Potassium S-(2-amino-3-chlorophenyl)thiosulfate. | Dimethylamine | (structure) | Green. |
| 20 | Nickel phthalocyanine disulfonyl chloride monosulfonic acid. | Sodium S-(4-amino-3-ethoxyphenyl)thiosulfate. | Methylamine | (structure) | Do. |
| 21 | ----do---- | Sodium S-(2-amino-5-methylphenyl)thiosulfate. | 1,1-dimethyl-hydrazine. | (structure) | Do. |

Example 22

The green dyestuff of the formula

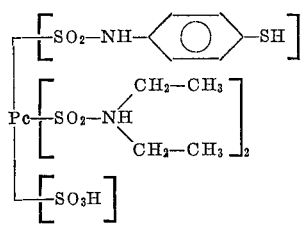

wherein Pc is the radical of copper phthalocyanine, may be produced as follows.

This example is the same as Example 17 above, except that 95.2 parts (0.10 mol) of copper phthalocyanine trisulfonyl chloride monosulfonic acid are substituted for the cobalt phthalocyanine disulfonyl chloride monosulfonic acid of Example 17; except that 25 parts (0.11 mol) of sodium S-4-aminophenylthiosulfate are substituted for the sodium S-(4-amino-3-ethylphenyl)thiosulfate of Example 17; and except that 51.1 parts of diethylamine are substituted for the ammonia of Example 17.

In the examples given in the following table, the procedure is the same as that given in Example 22, and the examples in the table indicate that a molecular proportion of the particular phthalocyanine trisulfonyl chloride monosulfonic acid in the second column is reacted with a molecular portion of the thiosulfate in the third column, and the result condensed with two molecular proportions of the HZ compound in the fourth column to produce the dye shown in the fifth column, in which formula Pc represents the radical of the phthalocyanine portion of the trisulfonyl chloride monosulfonic acid shown in the second column.

| Ex. No. | Phthalocyanine trisulfonyl monosulfonic acid | Thiosulfate | HZ | Dye | Color |
|---|---|---|---|---|---|
| 23 | Phthalocyanine trisulfonyl chloro monosulfonic acid. | Potassium S-(5-amino-2-bromo phenyl)thiosulfate. | Methylamine | $Pc\left\{\begin{array}{l}[-SO_2-NH-\bigcirc-Br]\\ \quad\quad\quad\quad\quad SH\\ [-SO_2-NH-CH_3]_2\\ [-SO_3H]\end{array}\right.$ | Green. |
| 24 | Nickel trisulfonyl chloride monosulfonic acid. | Sodium S-(2-amino-4-methoxyphenyl)thiosulfate. | Ammonia | $Pc\left\{\begin{array}{l}[-SO_2-NH-\bigcirc-OCH_3]\\ \quad\quad\quad\quad\quad SH\\ [-SO_2-NH_2]_2\\ [-SO_3H]\end{array}\right.$ | Blue. |
| 25 | Cobalt trisulfonyl chloride monosulfonic acid. | Sodium S-(4-amino-3-methylphenyl)thiosulfate. | 3-phenetidine | $Pc\left\{\begin{array}{l}[-SO_2-NH-\bigcirc-SH]\\ \quad\quad\quad\quad CH_3\\ [-SO_2-NH-\bigcirc-OCH_2-CH_3]_2\\ [-SO_3H]\end{array}\right.$ | Green. |
| 26 | Copper trisulfonyl chloride monosulfonic acid. | Sodium S-(4-amino-3-methoxyphenyl)thiosulfate. | 4-methylphenyl-hydrazine. | $Pc\left\{\begin{array}{l}[-SO_2-NH-\bigcirc-SH]\\ \quad\quad\quad\quad OCH_3\\ [-SO_2-NH-NH-\bigcirc-CH_3]_2\\ [-SO_3H]\end{array}\right.$ | Do. |

Example 27

The blue dyestuff of the formula

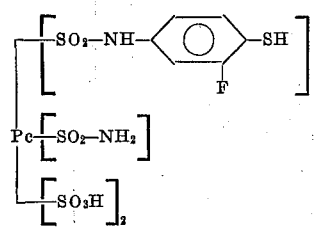

wherein Pc is the radical of phthalocyanine, may be produced as follows.

This example is the same as Example 1 above, except that 127.0 parts (0.10 mol) of phthalocyanine disulfonyl chloride disulfonic acid are substituted for the copper phthalocyanine disulfonyl chloride of Example 1, and except that 27.0 parts (0.11 mol) of sodium S-(4-amino-2-fluorophenyl)thiosulfate are substituted for the sodium S-4-aminophenylthiosulfate of Example 1.

In the examples given in the following table the procedure is the same as that given in Example 27, and the examples in the table indicate that a molecular proportion of the particular phthalocyanine disulfonyl chloride disulfonic acid in the second column is reacted with a molecular proportion of the thiosulfate in the third column, and the result condensed with a molecular proportion of the HZ compound in the fourth column to produce the dye shown by structural formula in the fifth column, in which formula Pc represents the radical of the phthalocyanine portion of the sulfonyl chloride shown in the second column.

Example 31

The turquoise dyestuff of the formula

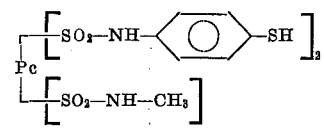

wherein Pc is the radical of nickel phthalocyanine may be prepared as follows.

This example is the same as Example 1 above, except that 86.7 parts (0.10 mol) of nickel phthalocyanine trisulfonyl chloride are substituted for the copper phthalocyanine disulfonyl chloride of Example 1, except that the amount of sodium S-4-aminophenylthiosulfate is increased to 50.0 parts (0.22 mol), except that the amount of 20% aqueous $Na_2CO_3$ added to maintain pH 7.0 is increased to 84 parts, and except that 51.7 parts of 30% aqueous methylamine are substituted for the ammonia of Example 1.

In the examples given in the following table the procedure is the same as given in Example 31, and the examples in the table indicate that a molecular proportion of the particular phthalocyanine trisulfonyl chloride in the second column is reacted with two molecular proportions of the thiosulfate in the third column, the result condensed with one molecular proportion of the HZ compound in the fourth column to produce the dye shown by structural formula in the fifth column, in which formula Pc represents the radical of the phthalocyanine portion of the sulfonyl chloride in the second column.

| Ex. No. | Phthalocyanine disulfonyl chloride disulfonic acid | Thiosulfate | HZ | Dye | Color |
|---|---|---|---|---|---|
| 28 | Cobalt phthalocyanine disulfonyl chloride disulfonic acid. | Sodium S-(2-amino-4-ethylphenyl)thiosulfate. | Ethylamine | $Pc\!\!-\!\![SO_2\!-\!NH\!-\!C_6H_3(SH)(CH_2\!-\!CH_3)]\,[SO_2\!-\!NH\!-\!CH_2\!-\!CH_3]\,[SO_3H]_2$ | Green. |
| 29 | Copper phthalocyanine disulfonyl chloride disulfonic acid. | Potassium S-4-aminophenylthiosulfate. | Dimethylamine | $Pc\!\!-\!\![SO_2\!-\!NH\!-\!C_6H_4\!-\!SH]\,[SO_2\!-\!N(CH_3)_2]\,[SO_3H]_2$ | Do. |
| 30 | Phthalocyanine disulfonyl chloride disulfonic acid. | Sodium S-4-aminophenylthiosulfate. | Ethylhydrazine | $Pc\!\!-\!\![SO_2\!-\!NH\!-\!C_6H_4\!-\!SH]\,[SO_2\!-\!NH\!-\!NH\!-\!CH_2\!-\!CH_3]\,[SO_3H]_2$ | Do. |

| Ex. No. | Phthalocyanine trisulfonyl chloride | Thiosulfate | HZ | Dye | Color |
|---|---|---|---|---|---|
| 32 | Cobalt phthalocyanine trisulfonyl chloride. | Potassium S-(3-amino-5-chlorophenyl)thiosulfate. | Ammonia | $Pc\begin{bmatrix}-SO_2-NH-\langle\bigcirc\rangle\begin{matrix}SH\\Cl\end{matrix}\end{bmatrix}_2 \begin{bmatrix}-SO_2-NH_2\end{bmatrix}$ | Blue. |
| 33 | Copper phthalocyanine trisulfonyl chloride. | Sodium S-(2-amino-6-methoxyphenyl)thiosulfate. | Dimethylamine | $Pc\begin{bmatrix}-SO_2-NH-\langle\bigcirc\rangle\begin{matrix}SH\ OCH_3\end{matrix}\end{bmatrix}_2 \begin{bmatrix}-SO_2N\begin{matrix}CH_3\\CH_3\end{matrix}\end{bmatrix}$ | Green. |
| 34 | Phthalocyanine trisulfonyl chloride. | Sodium S-(4-amino-2-methylphenyl)thiosulfate. | Aniline | $Pc\begin{bmatrix}-SO_2-NH-\langle\bigcirc\rangle-SH\\ CH_3\end{bmatrix}_2 \begin{bmatrix}-SO_2-NH-\langle\bigcirc\rangle\end{bmatrix}$ | Do. |
| 35 | Cobalt phthalocyanine trisulfonyl chloride. | Sodium S-(5-amino-2-bromophenyl)thiosulfate. | 1,1-diethylhydrazine. | $Pc\begin{bmatrix}-SO_2-NH-\langle\bigcirc\rangle\begin{matrix}SH\\Br\end{matrix}\end{bmatrix}_2 \begin{bmatrix}-SO_2-NH-N\begin{matrix}CH_2-CH_3\\CH_2-CH_3\end{matrix}\end{bmatrix}$ | Do. |

*Example 36*

The green dyestuff of the formula

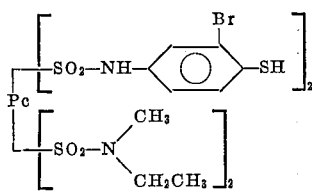

wherein Pc is the radical of cobalt phthalocyanine, is prepared as follows.

This example is the same as Example 17 above, except that 96.6 parts (0.10 mol) of cobalt phthalocyanine tetrasulfonyl chloride are substituted for the cobalt phthalocyanine disulfonyl chloride monosulfonic acid of Example 17, except that 70.9 parts (0.22 mol) potassium S-(4-amino-2-bromophenyl)thiosulfate are substituted for the sodium S-(4-amino-3-ethylphenyl)thiosulfate of Example 17, except that the amount of 20% aqueous $Na_2CO_3$ added to maintain pH 7.0 is increased to 84 parts, and except that 35.4 parts of methylethylamine are substituted for the ammonia of Example 17.

In the examples given in the following table, the procedure is the same as that given in Example 36, and the examples in the table indicate that a molecular proportion of the particular phthalocyanine tetra sulfonyl chloride in the second column is reacted with two molecular proportions of the thiosulfate in the third column, and the result condensed with two molecular proportions of the HZ compound in the fourth column to produce the dye shown in the fifth column, in which formula Pc represents the radical of the phthalocyanine portion of the tetrasulfonyl chloride shown in the second column.

| Ex. No. | Phthalocyanine tetrasulfonyl chloride | Thiosulfate | HZ | Dye | Color |
|---|---|---|---|---|---|
| 37 | Copper phthacyanine tetrasulfonyl chloride. | Sodium S-(5-amino-2-ethoxyphenyl)thiosulfate. | Ammonia | $Pc\begin{bmatrix}-SO_2-NH-\langle\bigcirc\rangle\begin{smallmatrix}SH\\-OCH_2-CH_3\end{smallmatrix}\end{bmatrix}_2 \begin{bmatrix}-SO_2-NH_2\end{bmatrix}_2$ | Blue. |
| 38 | Phthalocyanine tetrasulfonyl chloride. | Potassium S-(2-amino-5-methylphenyl)thiosulfate. | Methylamine | $Pc\begin{bmatrix}-SO_2-NH-\langle\bigcirc\rangle\begin{smallmatrix}SH\\-CH_3\end{smallmatrix}\end{bmatrix}_2 \begin{bmatrix}-SO_2-NH-CH_3\end{bmatrix}_2$ | Green. |
| 39 | Nickel phthalocyanine tetrasulfonyl chloride. | Sodium S-4-aminophenyl-thiosulfate. | Aniline | $Pc\begin{bmatrix}-SO_2-NH-\langle\bigcirc\rangle-SH\end{bmatrix}_2 \begin{bmatrix}-SO_2-NH-\langle\bigcirc\rangle\end{bmatrix}_2$ | Do. |
| 40 | Nickel phthalocyanine tetrasulfonyl chloride. | Potassium S-4-aminophenylthiosulfate. | 3-methylphenyl-hydrazine. | $Pc\begin{bmatrix}-SO_2-NH-\langle\bigcirc\rangle-SH\end{bmatrix}_2 \begin{bmatrix}-SO_2-NH-NH-\langle\bigcirc\rangle\\ \quad\quad\quad\quad\quad\quad\quad\quad CH_3\end{bmatrix}_2$ | Do. |

*Example 41*

The green dyestuff of the formula

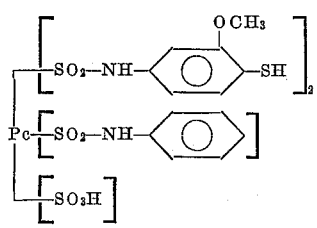

wherein Pc is the radical of copper phthalocyanine, may be produced as follows.

95.2 parts (0.10 mol) of copper phthalocyanine trisulfonyl chloride monosulfonic acid are slurried with ice and water at 0° C. to 1,000 parts, and adjusted to pH 5.5–6.0 by adding 15% aqueous KOH; 60.1 parts (0.22 mol) of potassium S-(4-amino-2-methoxyphenyl)thiosulfate and 5 parts of mixed picolines catalyst are added thereto; the resulting mass is stirred one–two hours at 0° C. while pH 7.0 is maintained by adding 80 parts 15% aqueous KOH as needed, thereby permitting condensation.

46.6 parts of aniline are added to the resulting condensate; the mass is stirred 3 hours at 0° C. and 20 hours at room temperature while 15% KOH is added to maintain pH 7, thereby effecting a second condensation, whereupon the dye is in the form of a solution of the thiosulfuric acid salt.

If desired, the dyestuff may be isolated at this point as the thiosulfuric acid salt (S—SO$_3$K) by evaporating to dryness, or it may be hydrolyzed and recovered in the mercapto (—SH) form as follows.

700 parts of 32% HCl are added to the resulting condensate and the mass heated at reflux 6 hours to effect hydrolysis to the mercapto form.

The dyestuff is isolated by cooling the mass to 50° C., filtering, collecting the solids, washing the solids acid free with warm water, and optionally drying or preserving in the moist condition for subsequent use in preparation of a printing paste.

In the examples given in the following table the procedure is the same as that given in Example 41, and the examples in the table indicate that a molecular proportion of the particular phthalocyanine trisulfonyl chloride monosulfuric acid in the second column is reacted with two molecular proportions of the thiosulfate in the third column, and the result condensed with a molecular proportion of the HZ compound in the fourth column to produce the dye shown by structural formula in the fifth column, in which formula Pc represents the radical of the phthalocyanine portion of the sulfonyl chloride shown in the second column.

| Ex. No. | Phthalocyanine trisulfonyl chloride monosulfonic acid | Thiosulfate | HZ | Dye | Color |
|---|---|---|---|---|---|
| 42 | Phthalocyanine trisulfonyl chloride monosulfonic acid. | Potassium S-(3-amino-5-methylphenyl)thiosulfate. | Methylamine | $\text{Pc}\begin{bmatrix}[-SO_2-NH-\langle\bigcirc\rangle\overset{SH}{\underset{CH_3}{}}]_2 \\ [-SO_2-NH-CH_3] \\ [-SO_3H]\end{bmatrix}$ | Green. |
| 43 | Nickel phthalocyanine trisulfonyl chloride monosulfonic acid. | Sodium S-2-aminophenyl-thiosulfate. | Ammonia | $\text{Pc}\begin{bmatrix}[-SO_2-NH-\langle\bigcirc\rangle-SH]_2 \\ [-SO_2-NH_2] \\ [-SO_3H]\end{bmatrix}$ | Blue. |
| 44 | Cobalt phthalocyanine trisulfonyl chloride monosulfonic acid. | Sodium S-(4-amino-2-fluorophenyl)thiosulfate. | Dimethylamine | $\text{Pc}\begin{bmatrix}[-SO_2-NH-\langle\bigcirc\rangle\overset{F}{-SH_2}]_2 \\ [-SO_2-N(CH_3)_2] \\ [-SO_3H]\end{bmatrix}$ | Green. |
| 45 | Copper phthalocyanine trisulfonyl chloride monosulfonic acid. | Sodium S-(4-amino-2-ethylphenyl)thiosulfate. | Hydrazine | $\text{Pc}\begin{bmatrix}[-SO_2-NH-\langle\bigcirc\rangle-CH_2-CH_3]_2 \\ [-SO_2-NH-NH_2] \\ [-SO_3H]\end{bmatrix}$ | Do. |

*Example 46*

The turquoise dyestuff of the formula

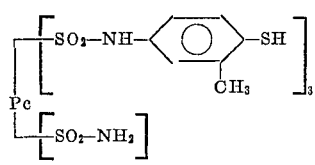

wherein Pc is the radical of phthalocyanine may be prepared as follows.

This example is the same as Example 1, except that 90.9 parts (0.10 mol) of phthalocyanine tetrasulfonyl chloride are substituted for the copper phthalocyanine disulfonyl chloride of Example 1, except that 78.6 parts (0.33 mol) of sodium S-(4-amino-2-methylphenyl)thiosulfate are substituted for the sodium S-4-aminophenyl-thiosulfate of Example 1, and except that the amount of 20% aqueous $Na_2CO_3$ added to maintain pH 7.0 is increased to 126 parts.

In the examples given in the following table the procedure is the same as that given in Example 46, and the examples in the table indicate that a molecular proportion of the particular phthalocyanine tetrasulfonyl chloride in the second column is reacted with three molecular proportions of the thiosulfate in the third column, the result condensed with a molecular proportion of the HZ compound in the fourth column to produce the dye shown by structural formula in the fifth column, in which formula Pc represents the radical of the phthalocyanine portion of the sulfonyl chloride in the second column.

| Ex. No. | Phthalocyanine tetrasulfonyl chloride | Thiosulfate | HZ | Dye | Color |
|---|---|---|---|---|---|
| 47 | Nickel phthalocyanine tetrasulfonyl chloride. | Sodium S-3-aminophenylthiosulfate. | Methylamine | $Pc\left[\begin{array}{l}-SO_2-NH-\langle○\rangle-SH\\-SO_2-NH-CH_3\end{array}\right]_3$ | Green. |
| 48 | Cobalt phthalocyanine tetrasulfonyl chloride. | Sodium S-(2-amino-5-chlorophenyl)thiosulfate. | Aniline | $Pc\left[\begin{array}{l}-SO_2-NH-\langle○\rangle-Cl\\-SO_2-NH-\langle○\rangle\end{array}\right]_3$ | Do. |
| 49 | Copper phthalocyanine tetrasulfonyl chloride. | Potassium S-(4-amino-2-methoxyphenyl)thiosulfate. | Dimethylamine | $Pc\left[\begin{array}{l}-SO_2-NH-\langle○\rangle(OCH_3)-SH\\-SO_2-NH(CH_3)_2\end{array}\right]_3$ | Do. |
| 50 | Phthalocyanine tetrasulfonyl chloride. | Sodium S-4-aminophenylthiosulfate. | 1-methyl-1-ethylhydrazine. | $Pc\left[\begin{array}{l}-SO_2-NH-\langle○\rangle-SH\\-SO_2-NH-N(CH_3)(CH_3-CH_3)\end{array}\right]_3$ | Do. |

*Example 51*

The blue dyestuff of the formula

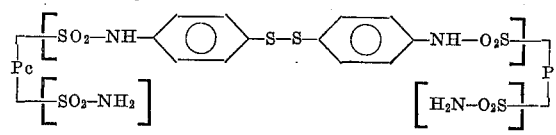

wherein Pc is the radical of copper phthalocyanine, may be prepared as follows.

77.3 parts (0.1 mol) copper phthalocyanine disulfonyl chloride are slurried with 700 parts acetone; 13.6 parts (0.05 mol) 4,4′-diaminodiphenyldisulfide and 100 parts pyridine are added thereto; the mass is stirred at room temperature 2 hours, thereby permitting condensation.

200 parts 29% aqueous ammonia are added to the resulting condensate, and stirred 24 hours at room temperature to effect a second condensation.

Isolation of the dye is effected as follows. The pH of the condensate is adjusted to 3.0 or less by addition of HCl. The condensate is filtered, the resulting solids washed with 5% aqueous HCl to remove excess diaminodiphenyldisulfide, and then washed free of HCl with water. The resulting dye solids may be dried, or may be preserved in the moist condition for subsequent preparation of a printing paste.

*Example 52*

The green dyestuff of the formula

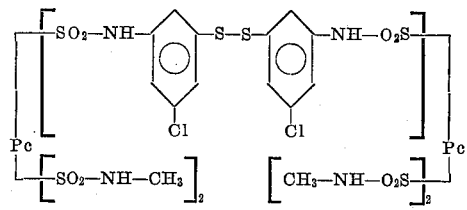

wherein Pc is the radical of cobalt phthalocyanine, may be prepared as follows.

86.7 parts (0.1 mol) cobalt phthalocyanine trisulfonyl chloride are slurried with ice and water at 0° C. to 1,000 parts, 17.4 parts (0.05 mol) 3,3′-diamino-5,5′-dichlorodiphenyldisulfide and 10 parts pyridine catalyst are added thereto, and the pH of the resulting mass is adjusted to pH 3.5 with 32% aqueous HCl; while maintaining pH 3.5 by addition of 10% aqueous Na$_2$CO$_3$ as needed, the mass is stirred at 0°–3° C. for 3 hours, gradually warmed to room temperature with stirring during 5 hours, and stirred at room temperature 14 hours, thereby permitting condensation.

62.1 parts 30% aqueous methylamine are added to the resulting condensate; the mass is stirred at room temperature 24 hours to effect a second condensation.

The dyestuff is isolated and recovered as in Example 51 above.

*Example 53*

The green dyestuff of the formula

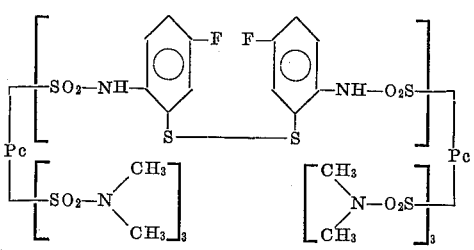

wherein Pc is the radical of nickel phthalocyanine may be prepared as follows.

This example is the same as Example 52 above, except that 96.5 parts (0.1 mol) nickel phthalocyanine tetrasulfonyl chloride are substituted for the cobalt phthalocyanine trisulfonyl chloride of Example 52, except that 15.6 parts (0.05 mol) 2,2′-diamino-5,5′-difluorodiphenyldisulfide are substituted for the 3,3′-diamino-5,5′-dichlorodiphenyldisulfide of Example 52, and 144 parts 25% aqueous dimethylamine are substituted for the methylamine of Example 52.

*Example 54*

The green dyestuff of the formula

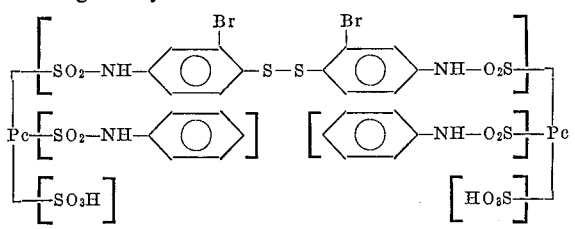

wherein Pc is the radical of phthalocyanine, may be prepared as follows.

This example is the same as Example 51 above, except that 79.2 parts (0.1 mol) phthalocyanine disulfonyl chloride monosulfonic acid are substituted for the copper phthalocyanine disulfonyl chloride of Example 51. 22.3 parts (0.05 mol) 4,4'-diamino-2,2'-dibromodiphenyldisulfide are substituted for the 4,4'-diaminodiphenydisulfide of Example 51, and except that 46.6 parts aniline are substituted for the ammonia of Example 51.

*Example 55*

The green dyestuff of the formula

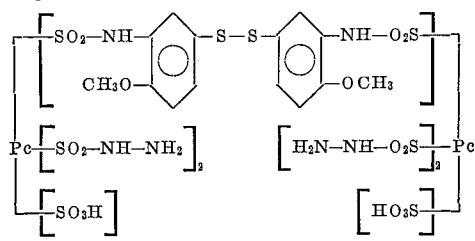

wherein Pc is the radical of copper phthalocyanine may be prepared as follows.

This example is the same as Example 52 above, except that 95.2 parts (0.1 mol) copper phthalocyanine trisulfonyl chloride monosulfonic acid are substituted for the cobalt phthalocyanine trisulfonyl chloride of Example 52, except that 16.9 parts (0.05 mol) 3,3'-diamino-4,4'-dimethoxydiphenyldisulfide are substituted for the 3,3'-diamino-5,5'-dichlorodiphenyldisulfide of Example 52, and 61 parts 85% hydrazine hydrate are substituted for the methylamine of Example 52.

*Example 56*

The green dyestuff of the formula

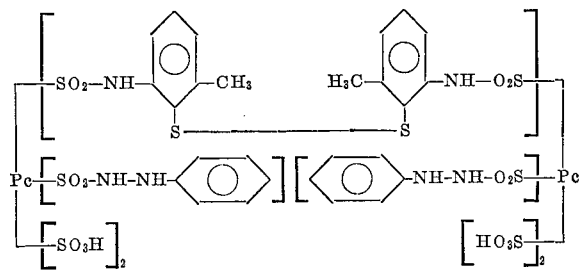

wherein Pc is the radical of cobalt phthalocyanine, may be prepared as follows.

132.7 parts (0.1 mol) cobalt phthalocyanine disulfonyl chloride disulfonic acid are slurried with ice and water at 0° C. to 1,000 parts, 15.2 parts (0.05 mol) 2,2'-diamino-6,6'-dimethyldiphenyldisulfide and 10 parts 4-picoline catalyst are added thereto, and the pH of the resulting mass is adjusted to pH 3.5 with 32% aqueous HCl; while maintaining pH 3.5 by addition of 7.5% aqueous NaOH as needed, the mass is stirred at 0°–3° C. for 3 hours, gradually warmed to room temperature with stirring during 5 hours, and stirred at room temperature 14 hours, thereby permitting condensation.

27.8 parts phenylhydrazine hydrochloride are added to the resulting condensate with enough ice to cool the mass to 0° C.; the pH of the mass is adjusted to pH 7.0 with 7.5% aqueous NaOH and there maintained while the mass is stirred at 0°–3° C. for 3 hours, gradually warmed to room temperature with stirring during 5 hours, and stirred at room temperature 14 hours, thereby effecting a second condensation.

The resulting dyestuff is isolated and collected as in Example 51.

*Example 57*

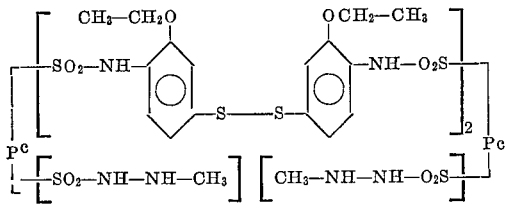

wherein Pc is the radical of nickel phthalocyanine may be prepared as follows.

This example is the same as Example 56 above, except that 86.7 parts (0.1 mol) nickel phthalocyanine trisulfonyl chloride are substituted for the cobalt phthalocyanine disulfonyl chloride disulfonic acid of Example 56, except 36.9 parts (0.11 mol) 4,4'-diamino-3,3'-diethoxydiphenyldisulfide are substituted for the 2,2' - diamino - 6,6' - dimethyldiphenyldisulfide of Example 56, and except that 21.7 parts methylhydrazine sulfate are substituted for the phenylhydrazine hydrochloride of Example 56.

*Example 58*

The green dyestuff of the formula

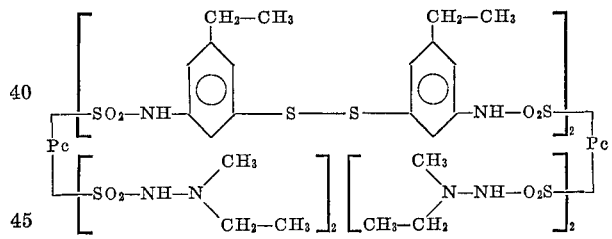

wherein Pc represents the radical of phthalocyanine may be prepared as follows.

This example is the same as Example 56 above except 90.9 parts (0.1 mol) phthalocyanine tetrasulfonyl chloride are substituted for the cobalt phthalocyanine disulfonyl chloride disulfonic acid of Example 56, except 33.4 parts (0.11 mol) 3,3' - diamino - 5,5' - diethyldiphenyldisulfide are substituted for the 2,2' - diamino - 6,6' - dimethyldiphenyldisulfide of Example 56, and except that 35.4 parts 1-methyl-1-ethylhydrazine are substituted for the phenylhydrazine hydrochloride of Example 56.

*Example 59*

The blue dyestuff of the formula

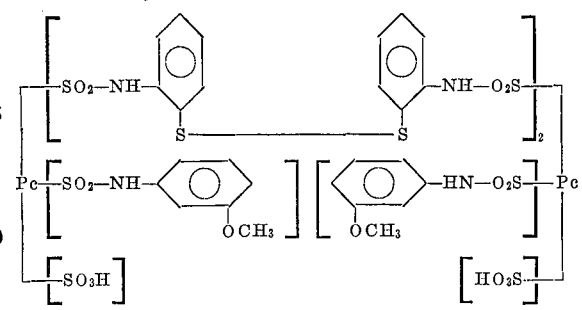

wherein Pc represents the radical of copper phthalocyanine may be prepared as follows.

95.2 parts (0.1 mol) copper phthalocyanine trisulfonyl chloride monosulfonic acid are slurried with ice and water to 1,000 parts, 27.3 parts (0.11 mol) 2,2' - diaminodiphenyldisulfide and 10 parts of 3 - picoline catalyst are added thereto, and the pH of the resulting mass is adjusted to 3.5 with 32% aqueous HCl; while maintaining pH 3.5 by the addition of 10% aqueous $Na_2CO_3$, the mass is stirred at 0°–3° C. for 3 hours, gradually warmed to room temperature with stirring during 5 hours, stirred at room temperature 14 hours, thereby permitting condensation.

49.2 parts 3-anisidine are added to the resulting condensate; the mass is stirred at room temperature 24 hours to effect a second condensation.

The dyestuff is isolated and recovered as in Example 51 above.

*Example 60*

The blue dyestuff of the formula $$Pc\begin{bmatrix}-SO_2-NH-\langle O\rangle-S-S-\langle O\rangle-NH-O_2S-\\-SO_2-NH-\langle O\rangle\\\quad\quad Cl\end{bmatrix}_3\begin{bmatrix}\\\langle O\rangle-NH-O_2S-\\Cl\end{bmatrix}Pc$$

wherein Pc represents the radical of copper phthalocyanine may be prepared as follows.

This example is the same as Example 59 above except 97.0 parts (0.1 mol) of copper phthalocyanine tetrasulfonyl chloride are substituted for the copper phthalocyanine trisulfonyl chloride monosulfuric acid of Example 59, except that 40.9 parts (0.16 mol) of 4,4' - diaminodiphenyldisulfide are substituted for the 2,2' - diaminodiphenyldisulfide of Example 59, except that 5 parts 3,4-picolines catalyst are substituted for the 3-picoline of Example 59, and except that 51.0 parts 2-chloroaniline are substituted for the 3-anisidine of Example 59.

*Example 61*

The bright blue phthalocyanine dyestuff of the formula $$Pc\begin{bmatrix}-SO_2-NH-\langle O\rangle-SH\end{bmatrix}_{1.2}\begin{bmatrix}-SO_2-NH_2\end{bmatrix}_{1.3}\begin{bmatrix}-SO_3H\end{bmatrix}_{0.5}$$

wherein Pc is the radical of copper phthalocyanine, may be prepared as follows.

175 parts 99.8% copper phthalocyanine are added evenly during one hour to 1130 parts chlorosulfonic acid being stirred at 20°–40° C.; the temperature is raised during a period of one hour to 135° C. and then maintained at 135°–140° C. for 3 additional hours, cooled to 85° C. during 30 minutes; held at 80°–85° C. for 1 hr. while 147 parts 98% thionyl chloride are added thereto; stirred 3 additional hours at 80°–85° C.; and cooled to room temperature. The mass is drowned in ice and water at 0° C., causing precipitation; the precipitate is filtered at 0° C., and washed acid free with water at 0° C.

The precipitate is slurried with ice and water at 0° C. to 2,000 parts; adjusted to pH 5.5–6.0 by adding 20% aqueous $Na_2CO_3$; 86.0 parts sodium S-4-aminophenylthiosulfate and 20 parts pyridine catalyst are added thereto. The resulting mass is stirred 95 minutes at 0° C. while pH 7.0 is maintained by adding 240 parts 20% aqueous $Na_2CO_3$, 540 parts 29% aqueous ammonia are added while the temperature is maintained at 0° C. The mass is stirred 3 hours at 0° C., warmed evenly during 5 hours to room temperature, and stirred 16 hours at room temperature, whereupon the dye is in the form of a solution of its thiosulfuric acid salt.

If desired, the dyestuff may be isolated at this point as its thio surfuric acid salt (—S—$SO_3Na$) by evaporating to dryness, or it may be hydrolyzed and recovered in its mercapto (—SH) form as follows.

410 parts 98% $H_2SO_4$ are added to the thiosulfuric acid salt solution, and the mass is heated evenly to reflux during 5 hours, and reflux is maintained for 12 hours. The dyestuff is isolated and recovered as in Example 1.

*Example 62*

The bright green phthalocyanine dyestuff of the formula $$Pc\begin{bmatrix}-SO_2-NH-\langle O\rangle-SH\end{bmatrix}_{1.2}\begin{bmatrix}-SO_2-NH-NH_2\end{bmatrix}_{1.3}\begin{bmatrix}-SO_3H\end{bmatrix}_{0.5}$$

wherein Pc is the radical of copper phthalocyanine, may be prepared as follows.

This example is the same as Example 61 above except that 120 parts of 85% hydrazine hydrate are substituted for the ammonia of Example 61, and the solution of thiosulfuric acid salt form of the dye is diluted to 5,000 parts before 460 parts 98% $H_2SO_4$ are added.

*Example 63*

The blue dyestuff of the formula $$Pc\begin{bmatrix}-SO_2-NH-\langle O\rangle-SSO_3Na\end{bmatrix}_{1.2}\begin{bmatrix}-SO_2-NHOH\end{bmatrix}_{1.3}\begin{bmatrix}-SO_3H\end{bmatrix}_{0.5}$$

wherein Pc is the radical of copper phthalocyanine may be prepared as follows.

This example is the same as Example 61 above, except that the amount of $Na_2CO_3$ is reduced from 240 parts to 200 during the condensation with sodium S-4-aminophenylthiosulfate, except that 53.9 parts 98.7% hydroxylamine hydrochloride are substituted for the aqueous ammonia, and except that enough 20% aqueous $Na_2CO_3$ is added to maintain pH 7.0 during condensation with the hydroxylamine.

The dyestuff may be isolated as the thiosulfuric acid salt (—S—$SO_3Na$), shown above, or in the mercapto (—SH) form in the manner described in Example 61.

*Example 64*

The blue dyestuff of the formula $$Pc\begin{bmatrix}-SO_2-NH-\langle O\rangle-S-S-\langle O\rangle-NH-O_2S-\\-SO_2-NHOH\end{bmatrix}\begin{bmatrix}HOHN-O_2S-\end{bmatrix}Pc$$

may be prepared as follows.

This example is the same as Example 51 above, except that 200 parts of 7.11% aqueous hydroxylamine hydrochloride, adjusted to pH 7.0 with alkali, are substituted for the aqueous ammonia of Example 51.

All of the dyes of the present invention may be applied to cotton fabric by padding onto the fabric a composition comprising 20 parts dye, 945 parts water, and 35 parts 60% sodium sulfide, squeezing the fabric to 70% wet pick-up based on fabric weight, drying the fabric, steaming the fabric, passing the fabric into a chemical oxidizing bath comprising 985 parts water, 7.5 parts sodium dichromate, and 7.5 parts glacial acetic acid, scouring and drying the fabric.

The thiosulfuric acid salt forms of the dyes of the present invention may be applied to cotton fabric by padding onto the fabric a composition comprising 25 parts thiosulfuric acid salt form of the dye, 825 parts water, 50 parts thiourea and 100 parts urea, drying the fabric, passing the fabric for 90 seconds into a curing oven heated to 410° F., and optionally scouring and drying the fabric.

What is claimed is:
1. A phthalocyanine dyestuff of the formula

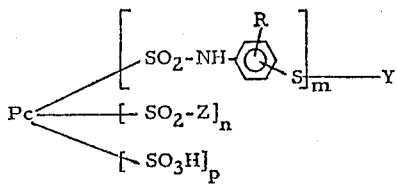

wherein Pc is the radical of a phthalocyanine selected from the group consisting of copper phthalocyanine, cobalt phthalocyanine, nickel phthalocyanine and phthalocyanine; Y is a member selected from the group consisting of $H_m$, $(-SO_3Na)_m$, $(-SO_3K)_m$, and

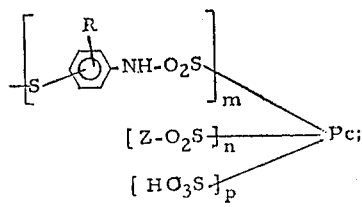

R is a member selected from the group consisting of hydrogen, halogen, alkoxy having one or two C atoms, and alkyl having one or two C atoms; Z is a member selected from the group consisting of $-NH_2$, $-NH$-lower alkyl,

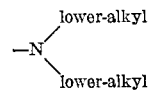

$-NH$-aryl, $-NH-NH_2$, $-NH-NH$-aryl, $-NHOH$, $-NH-NH$-lower alkyl, and

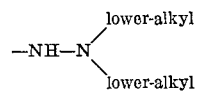

$m$ is a number from 1–3; $n$ is a number from 1–3; $p$ is a number from 0–2; and the sum of $m+n+p$ is a number from 2–4.

2. A dyestuff of the formula

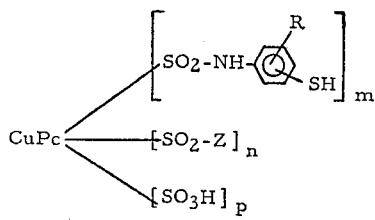

wherein CuPc is the radical of copper phthalocyanine; R is a member selected from the group consisting of hydrogen, halogen, alkoxy having one or two C atoms, and alkyl having one or two C atoms; Z is a member selected from the group consisting of $-NH_2$, $-NH$-lower alkyl,

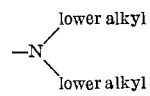

$-NH$-aryl, $-NH-NH_2$, $-NH-NH$-aryl, $-NHOH$, $-NH-NH$-lower alkyl, and

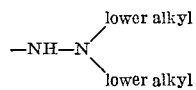

$m$ is a number from 1–3; $n$ is a number from 1–3; $p$ is a number from 0–2; and the sum of $m+n+p$ is a number from 2–4.

3. A dyestuff of the formula

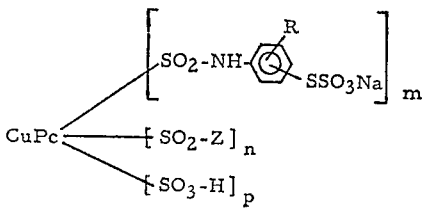

wherein CuPc, R, Z, $m$, $n$, $p$, and the sum of $m+n+p$ are as defined in claim 2.

4. A dyestuff of the formula

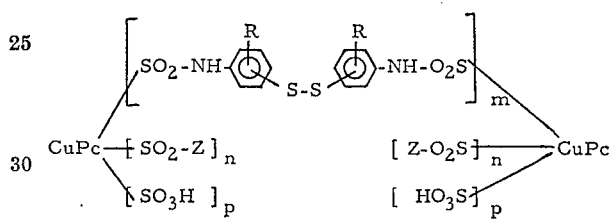

wherein CuPc, R, Z, $m$, $n$, $p$, and the sum of $m+n+p$ are as defined in claim 2.

5. The dyestuff of the formula

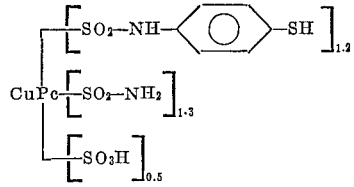

wherein CuPc is the radical of copper phthalocyanine.

6. The dyestuff of the formula

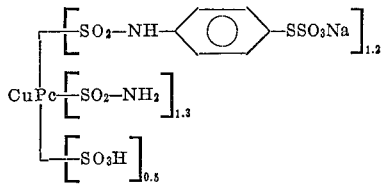

wherein CuPc is the radical of copper phthalocyanine.

References Cited

UNITED STATES PATENTS

| | | | |
|---|---|---|---|
| 3,226,395 | 12/1965 | Schimmelschmidt et al. | 260—314.5 |
| 3,236,860 | 2/1966 | Schultheis et al. | 260—314.5 |

FOREIGN PATENTS 749,349  5/1956  Great Britain.

OTHER REFERENCES

Belgian Chemical Abstracts, vol. 57 (1962), p. 16809e.

WALTER A. MODANCE, *Primary Examiner.*

JAMES A. PATTEN, *Assistant Examiner.*

UNITED STATES PATENT OFFICE
CERTIFICATE OF CORRECTION

Patent No. 3,334,116                          August 1, 1967

Wilson J. Bryan, Jr., et al.

It is hereby certified that error appears in the above numbered patent requiring correction and that the said Letters Patent should read as corrected below.

Column 4, line 59, for "dytstuff" read -- dyestuff --; columns 5 and 6, Example 2, in the structural formula, for

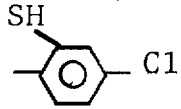      read      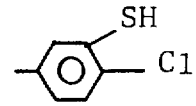

Example 3, second column, for "methoxyphenyl(thio-" read -- methoxyphenyl)thio- --; same Example 3, in the structural formula, for

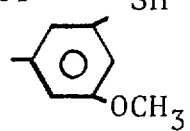      read      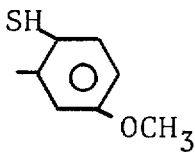

column 14, Example 28, in the structural formula for

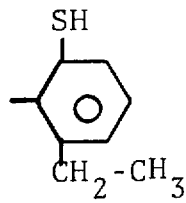                                        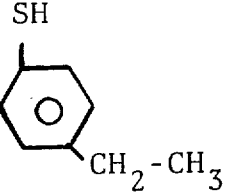

columns 19 and 20, Example 44, in the structural formula, for "-SH$_2$" read -- -SH --; Example 45, in the structural formula, for

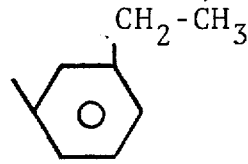      read      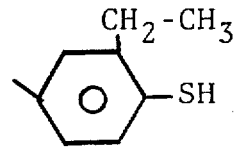

columns 21 and 22, Example 48, in the structural formula for

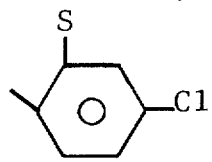      read      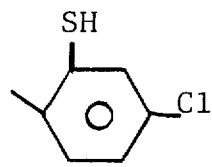

same columns, Example 50, in the structural formula for

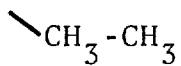     read     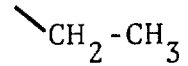

column 25, line 75, for "thio surfuric" read -- thiosulfuric --.

Signed and sealed this 9th day of July 1968.

(SEAL)
Attest:

EDWARD M. FLETCHER, JR.  
Attesting Officer

EDWARD J. BRENNER  
Commissioner of Patents